United States Patent
Cha et al.

(10) Patent No.: US 10,277,483 B2
(45) Date of Patent: Apr. 30, 2019

(54) APPARATUS FOR TRANSMITTING/RECEIVING DATA AND SYSTEM COMPRISING THE SAME

(71) Applicant: LSIS CO., LTD., Gyeonggi-do (KR)

(72) Inventors: Jae-Hong Cha, Gyeonggi-do (KR);
Pil-Suk Kim, Gyeonggi-do (KR);
Ho-Young Kang, Gyeonggi-do (KR);
Jae-Hyung Lee, Gyeonggi-do (KR);
Seok-Chan Lee, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 97 days.

(21) Appl. No.: 15/224,087

(22) Filed: Jul. 29, 2016

(65) Prior Publication Data
US 2017/0034260 A1 Feb. 2, 2017

(30) Foreign Application Priority Data
Jul. 30, 2015 (KR) .......................... 10-2015-0108390

(51) Int. Cl.
*H04L 12/26* (2006.01)
*H04L 29/08* (2006.01)

(52) U.S. Cl.
CPC .......... *H04L 43/04* (2013.01); *H04L 67/2828* (2013.01); *H04L 67/2833* (2013.01); *H04L 67/327* (2013.01)

(58) Field of Classification Search
CPC ......... H04L 12/26; H04L 29/08; H04L 43/12; H04L 43/08; H04L 43/04; H04L 67/2833; H04L 65/4061; H04L 67/2828; G01D 4/004; G06F 16/95; A63F 13/12; A63F 13/48
See application file for complete search history.

(56) References Cited

U.S. PATENT DOCUMENTS

| | | | |
|---|---|---|---|
| 6,349,340 B1 | 2/2002 | Dyer et al. | |
| 6,442,596 B1* | 8/2002 | Dyer ....................... | H04L 29/06 707/E17.032 |
| 7,113,988 B2 | 9/2006 | Stern et al. | |
| 7,113,998 B1* | 9/2006 | Stern ................... | H04L 12/1859 709/231 |

(Continued)

FOREIGN PATENT DOCUMENTS

| | | |
|---|---|---|
| JP | 2006-311013 A | 11/2006 |
| JP | 2009-000495 A | 1/2009 |

(Continued)

OTHER PUBLICATIONS

European Office Action dated Aug. 28, 2017 corresponding to application No. 16178692.6-1853.

(Continued)

*Primary Examiner* — Sargon N Nano
(74) *Attorney, Agent, or Firm* — K&L Gates LLP

(57) ABSTRACT

Disclosed embodiments relate to apparatuses, systems, and methods for transmitting/receiving data. In some embodiments, a system includes a server operative to collect data from remote apparatuses and transmit the collected data to a client group, and at least one client group including at least one client, the client group checking data received from the server and acquiring data requested by the client.

5 Claims, 7 Drawing Sheets

(56) References Cited

U.S. PATENT DOCUMENTS

| | | | |
|---|---|---|---|
| 7,315,788 B1* | 1/2008 | Hoben | G05B 15/02 |
| | | | 702/50 |
| 7,886,975 B2 | 2/2011 | Matsu et al. | |
| 8,255,686 B1* | 8/2012 | Sharma | H05K 7/20836 |
| | | | 380/200 |
| 8,554,937 B2 | 10/2013 | Cha et al. | |
| 2002/0174172 A1* | 11/2002 | Hatalkar | G06F 9/542 |
| | | | 709/203 |
| 2006/0066455 A1* | 3/2006 | Hancock | H04Q 9/00 |
| | | | 340/870.01 |
| 2007/0271398 A1* | 11/2007 | Manchester | H04B 3/54 |
| | | | 709/249 |
| 2008/0045192 A1* | 2/2008 | Zhao | H04L 63/104 |
| | | | 455/414.2 |
| 2008/0315519 A1 | 12/2008 | Travis et al. | |
| 2009/0265775 A1* | 10/2009 | Wisely | H04L 63/0492 |
| | | | 726/9 |
| 2010/0094981 A1* | 4/2010 | Cordray | G06F 15/173 |
| | | | 709/222 |
| 2011/0112909 A1 | 5/2011 | Singh et al. | |
| 2011/0125831 A1* | 5/2011 | Adelman | G06F 16/954 |
| | | | 709/203 |
| 2012/0148267 A1* | 6/2012 | Kawai | G03G 15/5079 |
| | | | 399/8 |
| 2013/0064229 A1* | 3/2013 | Gidlund | H04W 28/065 |
| | | | 370/336 |
| 2013/0079936 A1* | 3/2013 | Cullen | G05B 23/0213 |
| | | | 700/283 |
| 2013/0084912 A1* | 4/2013 | Lindner | H04W 4/10 |
| | | | 455/518 |
| 2013/0094447 A1* | 4/2013 | Gidlund | H04W 88/16 |
| | | | 370/328 |
| 2014/0112244 A1* | 4/2014 | Lindner | H04L 65/4061 |
| | | | 370/328 |
| 2015/0177767 A1 | 6/2015 | Lee | |
| 2015/0220076 A1* | 8/2015 | Uchida | G05B 19/05 |
| | | | 700/97 |
| 2015/0317065 A1* | 11/2015 | Meriaz | G06F 17/2229 |
| | | | 715/703 |
| 2016/0055065 A1* | 2/2016 | Haustein | G06F 16/1734 |
| | | | 707/646 |
| 2016/0191698 A1* | 6/2016 | Dianda | H04M 3/02 |
| | | | 370/352 |
| 2017/0346725 A1* | 11/2017 | Lapidous | H04L 1/16 |

FOREIGN PATENT DOCUMENTS

| | | |
|---|---|---|
| JP | 2009-193395 A | 8/2009 |
| JP | 4920157 B2 | 4/2012 |
| JP | 5017811 B2 | 9/2012 |
| JP | 2015-037273 A | 2/2015 |
| KR | 10-2006-0039284 A | 5/2006 |
| KR | 10-2009-0001487 A | 1/2009 |
| KR | 10-2009-0099930 A | 9/2009 |
| KR | 10-2011-0000771 A | 1/2011 |
| KR | 10-2015-0072162 A | 6/2015 |

OTHER PUBLICATIONS

Search report issued in corresponding European application No. 16178692.6-1853 dated Nov. 8, 2016.

European Office Action for related European Application No. 16178692.6; action dated Mar. 1, 2018; (7 pages).

* cited by examiner

- Prior art -

APPARATUS FOR TRANSMITTING/RECEIVING DATA AND SYSTEM COMPRISING THE SAME

CROSS REFERENCE TO RELATED APPLICATIONS

This application claims the benefit of Korean Patent Application No. 10-2015-0108390, filed on Jul. 30, 2015, entitled "APPARATUS FOR TRANSMITTING/RECEIVING DATA AND SYSTEM COMPRISING THE SAME", which is hereby incorporated by reference in its entirety into this application.

BACKGROUND

Technical Field

Embodiments described herein relate to an apparatus for transmitting/receiving data and a system comprising the same.

Description of the Related Art

Typically, as a supervisory control and data acquisition (SCADA) system, which is called an intensive remote supervisory control system or supervisory control and data collection system, functions to supervise and control data. The SCADA system which supervises and control various kinds of remote apparatuses in a centralized manner, may function to notify and supervise data acquired through communication between a server and clients based on collected information.

Typically, the server and clients constituting the SCADA system perform unicast communication by employing a Peer to Peer scheme.

FIG. 1 is a block diagram illustrating transmitting/receiving data in a conventional SCADA system.

Referring to FIG. 1, when there are a server 10 and multiple clients 21, 22, . . . , N connected to the server 10, the server 10 transmits the same acquired data to the multiple clients 21, 22, . . . , N sequentially by repeating the transmission as many times as the number of clients. In addition, the server 10 receives transmission complete response signals for the data transmitted to the multiple clients 21, 22, . . . , N. The number of transmission complete response signals is equal to the number of transmissions.

Accordingly, the server 10 needs to repeat transmission/reception of the same data several times, and the clients may unnecessarily receive undesired data.

Thereby, in the case of typical transmission/reception of data, unnecessary operations and load may be produced between the server and clients, and accordingly time and resources may be unnecessarily wasted.

SUMMARY

In some embodiments, provided are a data transmitting/receiving data which is capable of transmitting data to multiple clients simultaneously and a system comprising the same.

In some embodiments, provided are a data transmitting/receiving apparatus which is capable of selectively transmitting data amended by the client among multiple data and a system comprising the same.

In some embodiments, provided are a data transmitting/receiving apparatus capable of effectively transmitting/receiving data to/from a plurality of clients configured to receive data and a system comprising the same.

Objects of the proposed embodiments are not limited to the aforementioned objects, and other objects which are not mentioned above will become apparent to those including ordinary skill in the art upon examination of the following description.

In accordance with one aspect, a system for transmitting/receiving data includes a server operative to collect data from remote apparatuses and transmit the collected data to a client group, and at least one client group including at least one client, the client group checking data received from the server and acquiring data requested by the client.

The server may store the client group information, classify the collected data based on the client group information, and transmit the classified data to a corresponding client group.

The server may generate identifier information about the collected data and transmit the collected data comprising the generated identifier information to the client group.

The client group may check the data received by the client group, and store only corresponding data based on the identifier information about the checked data.

The system may further include a router operative to transmit the data collected by the server to the client group.

A client included in the client group may be included in at least one client group.

The server may group clients requesting the same data into one group based on request the data information received from the client.

In accordance with another aspect, an apparatus for transmitting/receiving data includes a communication unit operative to collect the data from the remote apparatuses and transmit the collected data to at least one client group, a controller operative to classify the data collected through the communication unit according to pre-registered client groups and perform a control operation to transmit the classified data to a corresponding client group, and a storage unit operative to store the client group information and store the collected data and classified data.

The communication unit includes a first communication unit operative to collect the data from the remote apparatuses, and a second communication unit operative to transmit the collected data to a corresponding client group.

The second communication unit may be connected to a router operative to transmit the data to the client group.

According to embodiments of the disclosure, data may be transmitted to multiple clients simultaneously. Accordingly, time taken to transmit data and the amount of transmitted data may be minimized.

According to embodiments of the disclosure, data requested by a client may be selectively transmitted among multiple data. Accordingly, efficiency of a memory may be maximized.

DETAILED DESCRIPTION

Figure 1:
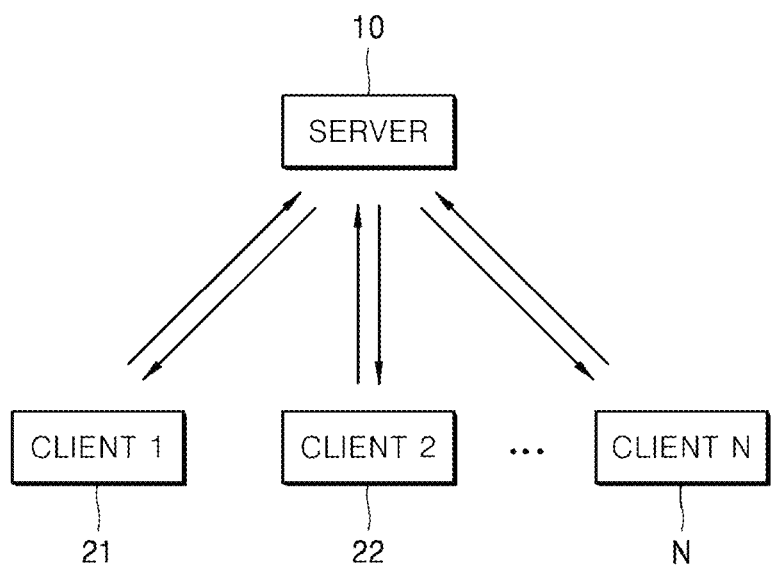
FIG. 1 is a block diagram illustrating transmitting/receiving data in a conventional SCADA system, according to the prior art.

Advantages and features of the present disclosure and methods to achieve them will become apparent from the descriptions of embodiments herein below with reference to the accompanying drawings. However, the present disclosure is not limited to embodiments disclosed herein but may be implemented in various different forms. The embodiments are provided for making the disclosure of the present disclosure thorough and for fully conveying the scope of the present disclosure to those skilled in the art. It is to be noted that the scope of the present disclosure is defined only by the claims. Like reference numerals denote like elements throughout the descriptions. Like reference numerals denote like elements throughout the descriptions.

In describing embodiments of the present disclosure disclosed in this specification, relevant well-known functions and constituents may not be described in detail if it is determined that such description can unnecessarily obscure the subject matter of the present disclosure. Terms which will be used below are defined in consideration of the functions of the corresponding elements in embodiments of the present disclosure. The definitions of the terms may vary depending on intention of a user or operator, a precedent case, or the like. Therefore, the terms should be defined based on the entire specification.

Figure 2:
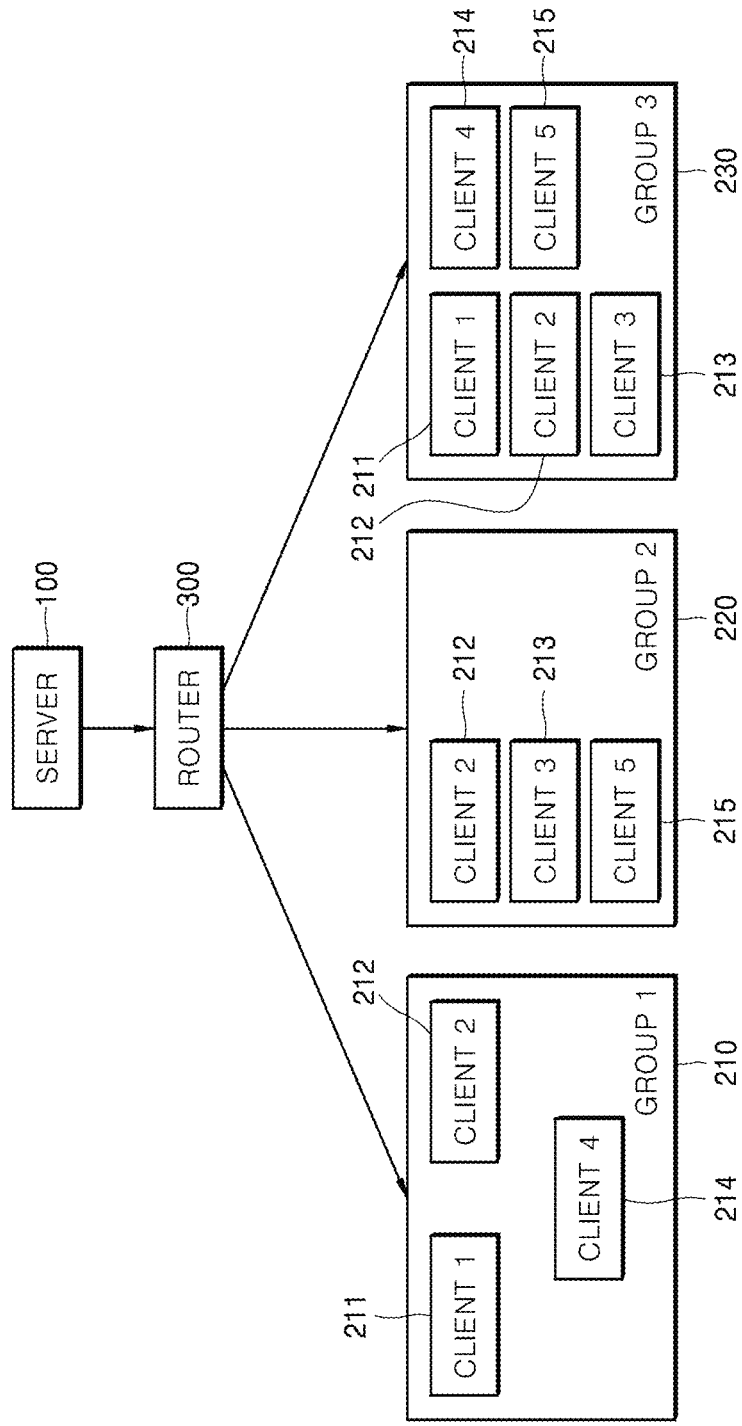
FIG. 2 is a schematic block diagram illustrating a system for transmitting/receiving data according to some embodiments of the present disclosure.

FIG. 2 is a schematic block diagram illustrating a system for transmitting/receiving data according to some embodiments of the present disclosure.

Referring to FIG. 2, the system for transmitting/receiving data includes a server 100, a plurality of client groups 210, 220, . . . , N and a router 300.

The server 100 may collect the data acquired from remote apparatuses. The data may include, for example, measurement data such as electric power data and hydraulic power data and object-to-be-supervised data.

The server 100 may be connected to a plurality of clients or client groups including the clients, and transmit the collected data to a corresponding client or client group. In addition, the server 100 may receive response signals for the transmitted data from clients or client groups.

Figure 3:
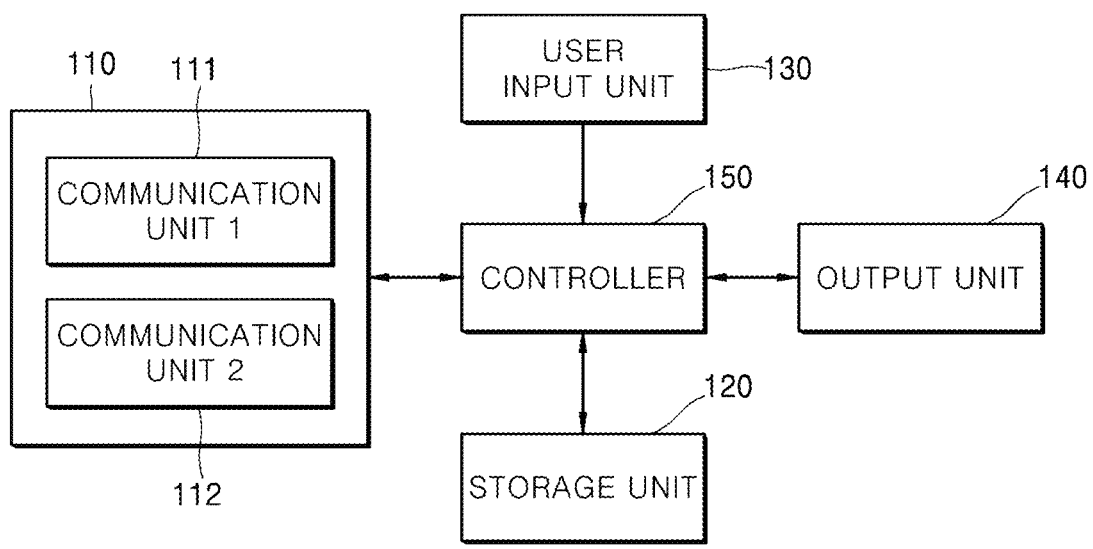
FIG. 3 is a schematic block diagram illustrating a server included in a system for transmitting/receiving data according to some embodiments of the present disclosure.

FIG. 3 is a schematic block diagram illustrating a server included in a system for transmitting/receiving data according to some embodiments of the present disclosure.

Referring to FIG. 3, the server 100 may include a communication unit 110, a storage unit 120, a user input unit 130, an output unit 140 and a controller 150.

The communication unit 110 may include at least one module enabling wireless or wired communication between the server 100 and remote apparatuses or between the server 100 and client groups. For example, the communication unit 110 may include a wireless Internet module, a short range communication module or a wired communication module.

The wireless Internet module, which refers to a module for wireless Internet access, may be installed inside or outside a mobile terminal 100. Available wireless Internet technologies may include Wireless LAN (WLAN) (Wi-Fi), Wireless broadband (Wibro), World Interoperability for Microwave Access (Wimax), and High Speed Downlink Packet Access (HSDPA).

The short range communication module refers to a module for short range communication. Available short range communication technologies may include Bluetooth, Radio Frequency Identification (RFID), infrared Data Association (IrDA), Ultra Wideband (UWB), and ZigBee.

In particular, the server 100 may include a plurality of communication units. In this case, the server 100 may collect data from remote apparatuses via a first communication unit 111 among the communication units, and transmit the collected data to a corresponding client group via a second communication unit 112.

The storage unit 120 may store a program for operation of the controller 150, and temporarily store input/output data. The storage unit 120 may include storage media of at least one type from among a flash memory type, hard disk type, multimedia card micro type, card type memory (e.g., SD or XD memory), random access memory (RAM), static random access memory (SRAM), read-only memory (ROM), electrically erasable programmable read-only memory (EEPROM), programmable read-only memory (PROM), magnetic memory, magnetic disk and optical disk. The server 100 may operate in relation to a web storage performing the storage function of the storage unit 120 on the Internet.

The storage unit 120 may store data collected through the communication unit 110. The storage unit 120 may store client group information including at least one client for transmitting the collected data. The client group information may include information about a client comprised in the client and information about data request in the client group information. According to some embodiments, the storage unit 120 may include one or more storage units including a storage unit for storing collected data and a storage unit for classifying the collected data into client groups and storing the same.

The user input unit 130 may generate history data needed for a user to control operation of the server 100. The user input unit 130 may include a keypad, dome switch, (resistive/capacitive) touchpad, jog wheel, and jog switch. The user input unit 130 may receive classification of data collected from remote apparatuses and information about client groups or receive a user control signal for processing the data.

The output unit 140, which is intended to generate output related to sight and sound, may include a display unit and a sound output unit.

The display unit displays (output) information processed by the server 100. For example, the display unit may display the operation of transmitting/receiving data processed by the server 100 and information about registered clients in various forms such as an image or a text.

The sound output unit may output the status information about the data processed by the server 100 through an audio system. In addition, the sound output unit may output alarm based on the condition of transmission/reception of the data.

Typically, the control 150 controls overall operation of the server 100. For example, the controller 150 may perform a control operation such that data collected through the communication unit 110 is classified into pre-registered client groups, and the classified data are transmitted to corresponding client groups. In addition, the controller 150 may generate identifiers for the collected data and collectively transmit the collected data including the generated identifiers to pre-registered client groups. Further, the controller 150 may group clients requesting the same data into one group based on requested data information received from a plurality of clients.

Client groups 210, 220, 230 connected to the server 100 configured as above may include at least one client. The clients 211, 212, 213, 214, 215 may be receivers for receiving data to be acquired from the server 100. For example, the clients may be devices such as terminals and PCs which are capable of checking data received through the server 100 or generating corresponding control data.

The client groups 211, 212, 213, 214, 215, which include at least one client, may be registered in the server 100 based on information such as the type and properties of data to receive. For the clients 211, 212, 213, 214, 215 included in the client groups 210, 220, 230, one client may belong to a plurality of client groups. That is, clients making a request to the server 100 for the same data may be grouped into one group according to information about the data the clients desire to receive. Herein, while it is illustrated that 3 client groups are configured, this is simply illustrative. The number of client groups may decrease or increase. In addition, the clients included in the respective client groups are merely illustrative and the number thereof may also increase or decrease.

A router 300 may be further provided to connect the server 100 with the client groups 210, 220, 230. The router 300 may transmit or relay all data transmitted from the server 100 to the respective client groups 210, 220, 230. The router 300 may include a router. Accordingly, even if the server 100 is connected to the client groups over different networks, collected data may be easily transmitted to the corresponding client groups. Hereinafter, operation of a server according to some embodiments of the present disclosure will be described in detail based on the system for transmitting/receiving data described above.

Figure 4:
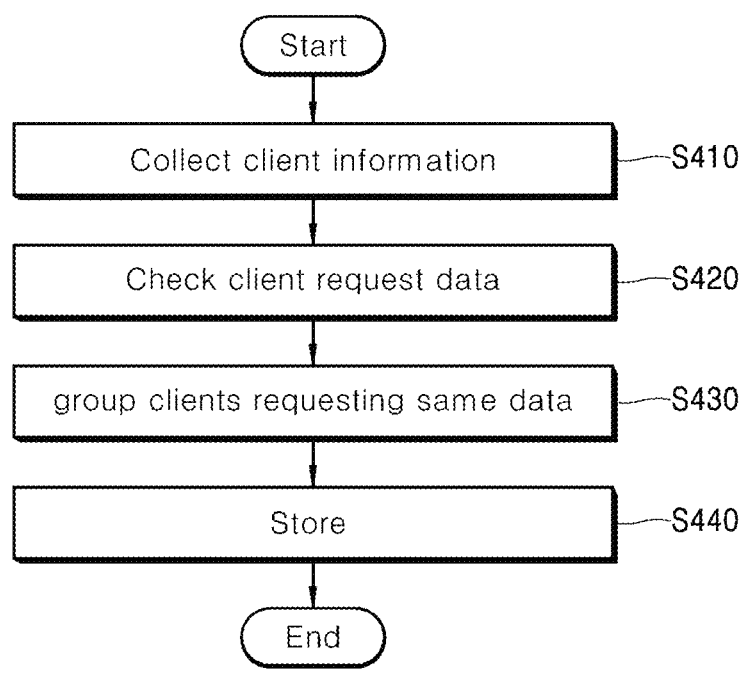
FIG. 4 is a flowchart illustrating processing of data in a server according to some embodiments of the present disclosure.

FIG. 4 is a flowchart illustrating processing of data in a server according to some embodiments of the present disclosure.

Referring to FIG. 4, the controller 150 of the server 100 may collect client information for transmitting data of remote apparatuses acquired by) the server 100 (S410).

The controller 150 may check the information about the data requested by the client based on the collected client information (S420). Specifically, the controller 150 may check the client information input through the communication unit 110 or the user input unit 130, and check identifier information about the client and the information about the data requested by the client. The data information requested by the client may be configured by various kinds of data classification information including the data name, date extension and data type.

The controller 150 may perform grouping for clients requesting the same data based on the acquired information about clients (S430). Specifically, the controller 150 may perform grouping of generating one group for clients requesting the same data among the data collected by the server 100 based on the client information. In performing the grouping, a client may be included in a plurality of groups. In some embodiments, a first client group 210 includes a first client 211, a second client 212 and a fourth client 214, a second client group 220 includes the second client 212, a third client 213 and a fifth client 215, and a third client group 230 includes the first client 211, the second client 212, the third client 213, the fourth client 214 and the fifth client 215. That is, one client may belong to a plurality of client groups according to data requested to the server 100.

Once grouping of the clients is completed, the controller 150 may store the client groups and client group information in the storage unit 120.

Hereinafter, a detailed description will be given of some embodiments in which the server 100 transmits data to client groups based on the client group information and client information registered in the server 100, with reference to FIG. 5.

Figure 5:
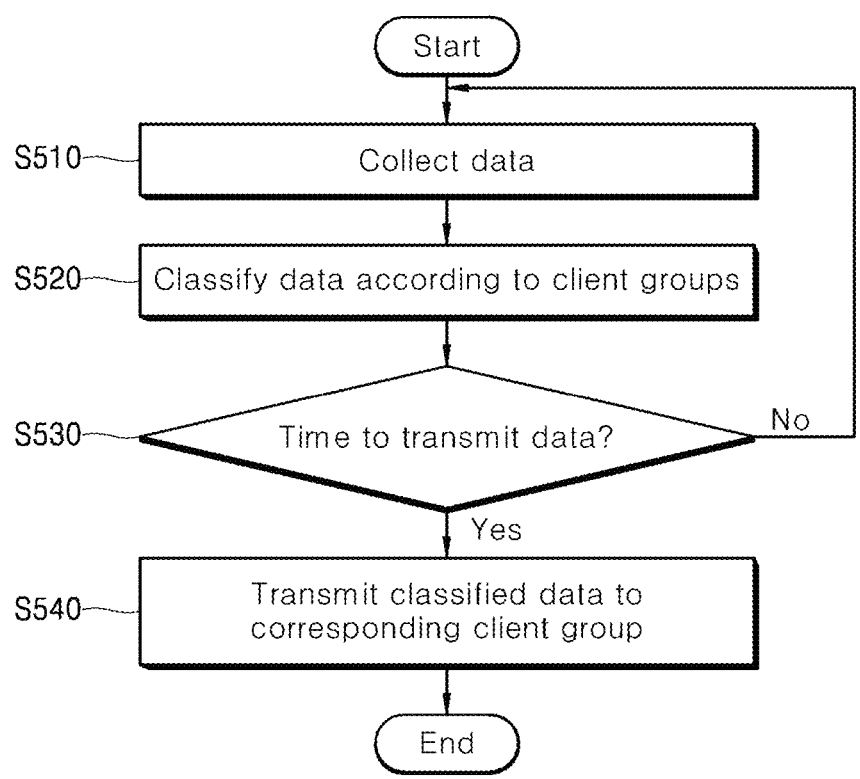
FIG. 5 is a flowchart illustrating transmitting/receiving data in a server according to some embodiments of the present disclosure.

FIG. 5 is a flowchart illustrating transmitting/receiving data in a server according to some embodiments of the present disclosure.

Referring to FIG. 5, the controller 150 of the server 100 may collect data from remote apparatuses via the communication unit 110 in real time/periodically (S510).

The controller 150 may classify collected data into pre-registered client groups. Specifically, the controller 150 may classy the data collected from the remote apparatuses into the respective pre-registered client groups based on the data information requested by the client groups in order to transmit the data to corresponding client groups.

The controller 150 determine whether it is time to transmit the collected and classified data to the client groups 210, 220, 230 (S530).

When it is confirmed that the time is a data transmission time, the controller 150 may transmit the classified data to the corresponding client groups (S540).

In this way, the server 100 may classify the collected data according to pre-registered client groups and transmit the classified data to corresponding client groups at the corresponding time.

Figure 6:
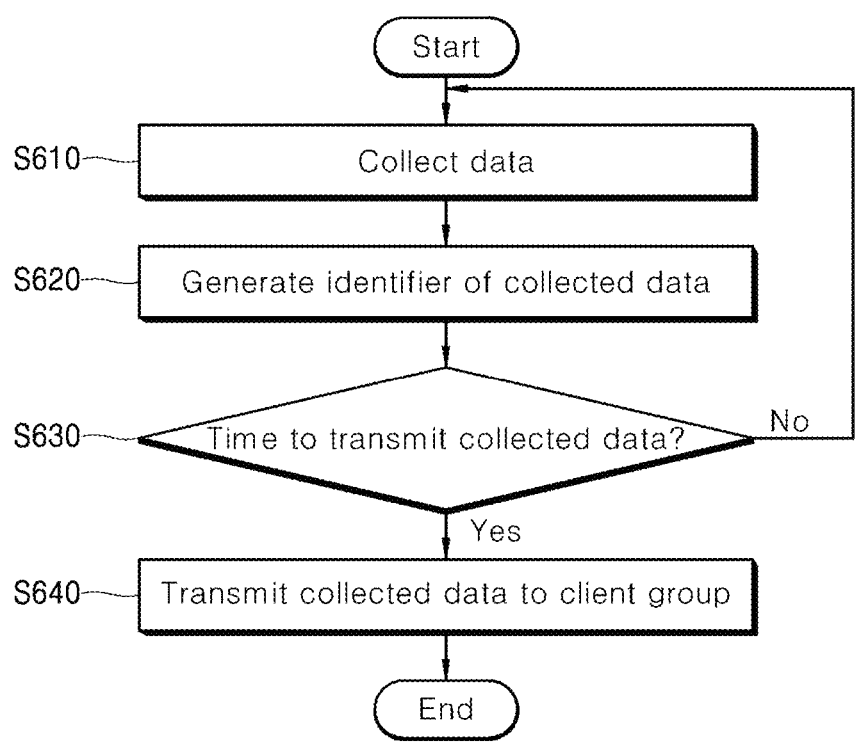
FIG. 6 is a flowchart illustrating transmitting/a receiving data in a server according to some embodiments of the present disclosure.

FIG. 6 is a flowchart illustrating transmitting/a receiving data in a server according to some embodiments of the present disclosure.

Referring to FIG. 6, the controller 150 may collect data from remote apparatuses via the communication unit 110 (S610).

The controller 150 may generate identifiers for the collected data (S620). Specifically, the controller 150 may generate identifier information for transmitting the collected data to all client groups. The identifier information may include information about the data. The identifier information may further include client group information corresponding to pre-registered client groups. In addition, a client group and the clients included in the client group may include identifier recognition information for recognizing received data for which identifiers have been generated. The identifier information and the identifier recognition information may be matched with each other and stored in the storage unit 120 of the server 100.

The controller 150 may check whether it is time to add the identifier information to the collected data and transmit the data to a client group (S630). Specifically, a periodicity of transmission of the collected data with the added identifier information to the client group may be preset and the data may be transmitted with the preset periodicity.

Information about the data transmission time may be set differently according to user settings or the extent of data collection.

When the time to transmit the collected data to the client groups reaches, the controller 150 may transmit the data collected via the communication unit 110 and provided with identifiers to all client groups connected to the server 100 (S640).

Hereinafter, a detailed description will be given of an operation of clients for receiving data collected and provided with identifiers by the server 100 when the data is transmitted to the client groups, with reference to FIG. 7.

Figure 7:
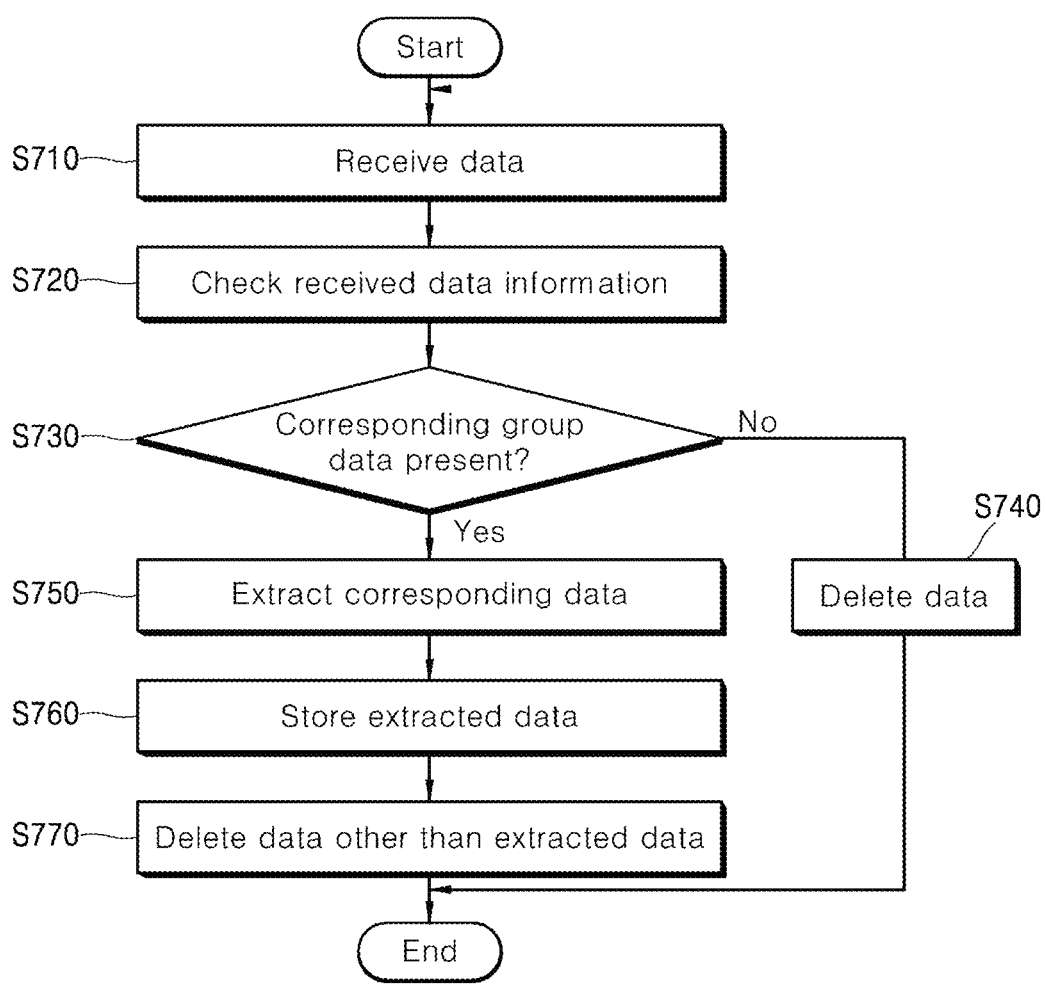
FIG. 7 is a flowchart illustrating operation of a client according to some embodiments of the present disclosure.

FIG. 7 is a flowchart illustrating operation of a client according to some embodiments of the present disclosure.

Referring to FIG. 7, the clients 211, 212, 213, 214, 215 included in the client groups 210, 220, 230 may receive the data from the server 100 (S710).

The clients 211, 212, 213, 214, 215 check the information (identifiers) about the received data (S720), and check whether the collected data include data of the client groups to which they belong (S730). Specifically, the clients 211, 212, 213, 214, 215 may receive the data comprising added identifier information and information about the client groups from the server 100, and determine whether data to be received by the client groups to which the clients belong is included in the received data, based on the information about the received data. More specifically, the respective clients 211, 212, 213, 214, 215 belonging to the client groups may include the identifier recognition information for recognizing data comprising an added identifier. That is, the clients 211, 212, 213, 214, 215 include identifier recognition information about desired data for extracting only data the clients, namely the corresponding client groups desire. Accordingly, the clients or client groups may check the identifier recognition information they include and the data transmitted with added identifiers from the server 100 and acquire data with an identifier matching the identifier recognition information.

If the data for the client groups to which the clients 211, 212, 213, 214, 215 belong is not included in the received data, the clients 211, 212, 213, 214, 215 may delete the received data without storing the data therein (S740).

If the data for the client groups to which the clients 211, 212, 213, 214, 215 belong is included in the received data, the clients 211, 212, 213, 214, 215 may extract corresponding data (S750).

The clients 211, 212, 213, 214, 215 may store the extracted data (S760), and delete the other data which are not extracted (S770). Specifically, the clients 211, 212, 213, 214, 215 may extract only data corresponding to the client groups to which they belong among the received data, and delete the other data. Thereby, efficiency of data management and efficiency of the storage space of the memory may be maximized.

A data transmitting/a receiving system according to some embodiments of the present disclosure is configured such that data is transferred from one server to multiple clients. The data collected from remote apparatuses by the server may be output from the server, comprising identifier information about clients to receive the data. Thereby, a router connected to the server relays the data of the server to the clients connected thereto, based on the identifier information. Thereby, transfer of the same data from the server to multiple clients may be enabled by outputting data once. Accordingly, the burden on the server according to data transmission/reception may be reduced.

Features, structures and effects described in some embodiments are included in at least some embodiments, but not limited to only some embodiments. Further, features, structures and effects of different environments may be employed in combination or variation by those skilled in the art. Accordingly, details related to such combination and variation should be understood as falling within the scope of some embodiments.

While embodiments of the disclosure include been described above, it should be understood that they include been presented by way of example only, and not limitation. It will be apparent to persons skilled in the art that various modifications and variations can be made to some embodiments without departing from the spirit and scope of some embodiments as defined by the accompanying claims. Thus, it is intended that some embodiments include modifications and variations that are within the scope of the appended claims and their equivalents. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A system for transmitting and/or receiving data, comprising: a server; and a plurality of client groups, wherein the server is configured to:

collect data from a plurality of remote apparatuses;

receive client information from a plurality of clients;

check information about data requested by the plurality of clients based on the received client information; group clients, among the plurality of clients, requesting same data into a same group among the plurality of client groups based on the information about data requested by the plurality of clients, wherein each of the plurality of client groups comprises at least one client that requested the same data;

generate respective identifier information about the collected data including client group information corresponding each of the plurality of client groups; and output the collected data together with the identifier information to all of the plurality of client groups simultaneously; and wherein each of the plurality of client groups is configured to check the data output from the server and extract only corresponding data based at least on the identifier information of the collected data, wherein each of the plurality of client groups the client group has identifier recognition information corresponding to the respective identifier information for extracting only data the corresponding client group desires, wherein each of the plurality of client groups the client group extracts only the corresponding data by checking the identifier recognition information with the identifier information about the checked data; wherein the server comprises: a communication unit configured to collect the data from the remote apparatuses and transmit the collected data to the plurality of client groups at least one client group; a controller configured to classify the data collected through the communication unit based at least on pre-registered client groups and perform a control operation to transmit the classified data to a corresponding client group; and a storage unit configured to store the client group information and store the collected data and classified data.

2. The system according to claim 1, wherein the server is further configured to store client group information, classify the collected data based at least on the client group information, and transmit the classified data to a corresponding client group.

3. The system according to claim 1, further comprising a router configured to transmit the data collected by the server to the plurality of client groups.

4. The system according to claim 1, wherein the communication unit comprises: a first communication unit configured to collect the data from the remote apparatuses; and a second communication unit configured to transmit the collected data to the plurality of client groups.

5. The system according to claim 4, wherein the second communication unit is connected to a router configured to transmit the collected data to the plurality of client groups.

* * * * *